US011167775B2

(12) United States Patent
Zhang et al.

(10) Patent No.: US 11,167,775 B2
(45) Date of Patent: Nov. 9, 2021

(54) AUDITORY ASSISTANT MODULE FOR AUTONOMOUS VEHICLES

(71) Applicant: TuSimple, Inc., San Diego, CA (US)

(72) Inventors: Cheng Zhang, San Diego, CA (US); Xiaodi Hou, San Diego, CA (US); Sven Kratz, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 16/854,848

(22) Filed: Apr. 21, 2020

(65) Prior Publication Data
US 2020/0339145 A1    Oct. 29, 2020

Related U.S. Application Data

(60) Provisional application No. 62/839,477, filed on Apr. 26, 2019.

(51) Int. Cl.
| | |
|---|---|
| *B60W 50/14* | (2020.01) |
| *B60W 40/04* | (2006.01) |
| *B60W 40/08* | (2012.01) |
| *G05D 1/02* | (2020.01) |
| *H04R 5/02* | (2006.01) |

(52) U.S. Cl.
CPC ............ *B60W 50/14* (2013.01); *B60W 40/04* (2013.01); *B60W 40/08* (2013.01); *G05D 1/0212* (2013.01); *H04R 5/02* (2013.01); *B60W 2510/18* (2013.01); *B60W 2540/229* (2020.02); *B60W 2555/20* (2020.02); *H04R 2499/13* (2013.01)

(58) Field of Classification Search
None
See application file for complete search history.

(56) References Cited

U.S. PATENT DOCUMENTS 5,522,058 A * 5/1996 Iwasa .................. G06F 12/0813
                                                     711/121
9,517,767 B1 * 12/2016 Kentley ............. B60W 30/095
(Continued)

FOREIGN PATENT DOCUMENTS

| DE | 10345680 A1 | 5/2005 |
| DE | 102008021068 A1 | 10/2009 |
| DE | 102016003032 A1 | 9/2016 |

OTHER PUBLICATIONS

Extended European Search Report for European Patent Application No. 20170433.5, dated Sep. 16, 2020.

*Primary Examiner* — Fekadeselassie Girma
(74) *Attorney, Agent, or Firm* — Paul Liu; Julie Muyco; Perkins Coie, LLP

(57) ABSTRACT

Disclosed are devices, systems and methods for an audio assistant in an autonomous or semi-autonomous vehicle. In one aspect the informational audio assistant receives a first set of data from a vehicle sensor and identifies an object or condition using the data from the vehicle sensor. Audio is generated representative of a perceived danger of an object or condition. A second set of data from the vehicle sensor subsystem is received and the informational audio assistant determines whether an increased danger exists based on a comparison of the first set of data to the second set of data. The informational audio assistant will apply a sound profile to the generated audio based on the increased danger.

20 Claims, 9 Drawing Sheets

(56) References Cited

U.S. PATENT DOCUMENTS

| | | | | |
|---|---|---|---|---|
| 9,630,619 | B1* | 4/2017 | Kentley | G01C 21/32 |
| 10,131,323 | B1* | 11/2018 | Sterling | B60R 25/10 |
| 10,890,921 | B2* | 1/2021 | Gillett | G05D 1/0238 |
| 2014/0088857 | A1* | 3/2014 | Hollin, Jr. | G08G 5/0043 |
| | | | | 701/120 |
| 2017/0120803 | A1* | 5/2017 | Kentley | B60W 10/18 |
| 2017/0120804 | A1* | 5/2017 | Kentley | B60W 30/08 |
| 2017/0120902 | A1* | 5/2017 | Kentley | B60W 10/04 |
| 2017/0297568 | A1* | 10/2017 | Kentley | G09G 5/363 |
| 2019/0369641 | A1* | 12/2019 | Gillett | A63F 9/24 |
| 2020/0186964 | A1* | 6/2020 | Lekutai | H04W 4/44 |

* cited by examiner

AUDITORY ASSISTANT MODULE FOR AUTONOMOUS VEHICLES

CROSS REFERENCE TO RELATED APPLICATIONS

The present application claims the benefit of priority to U.S. Provisional Patent Application No. 62/839,477 filed Apr. 26, 2019. The entire content of the before-mentioned patent application is incorporated by reference as part of the disclosure if this patent document.

TECHNICAL FIELD

This document relates to tools (systems, apparatuses, methodologies, computer program products, etc.) for semi-autonomous and autonomous control of vehicles, and more particularly, conveying information to a driver through auditory notifications, prompts, or cues.

BACKGROUND

A vehicle can be autonomously controlled to navigate along a path to a destination. Test drivers play critical roles in autonomous driving vehicle development. Test drivers face risks of testing incomplete autonomous vehicle systems because of the distractions of the autonomous driving system errors, timing of the need for driver intervention is unclear, and observation of potentially dangerous objects.

SUMMARY

Disclosed are devices, systems and methods for an audio assistant in an autonomous or semi-autonomous vehicle. In one aspect the informational audio assistant receives a first set of data from a vehicle sensor and identifies an object or condition using the data from the vehicle sensor. Audio is generated representative of a perceived danger of an object or condition. A second set of data from the vehicle sensor subsystem is received, and the informational audio assistant determines whether an increased danger exists based on a comparison of the first set of data to the second set of data. The informational audio assistant will apply a sound profile to the generated audio based on the increased danger. Thus, the technology described in this patent document can enable test drivers or other drivers to be notified of the moments in which intervention may be required to prevent accidents or to stop tests.

[Final Claims Will be Added Here]

The above and other aspects and features of the disclosed technology are described in greater detail in the drawings, the description and the claims.

BRIEF DESCRIPTION OF THE DRAWINGS

The various embodiments are illustrated by way of example, and not by way of limitation, in the figures of the accompanying drawings.

Identical reference numerals have been used, where possible, to designate identical elements that are common to the figures. It is contemplated that elements disclosed in one implementation may be beneficially utilized in other implementations without specific recitation.

DETAILED DESCRIPTION

Autonomous vehicles currently face several technical limitations hindering their interaction and adaptability to the real world. Current autonomous vehicle technology is often reactive—that is, decisions are based on a current condition or status. For instance, autonomous vehicles may be programmed to make an emergency stop upon detecting an object in the middle of the road. However, current autonomous vehicle technology has a limited capacity to determine the likelihood of being hit from behind or the probability of causing a highway pileup due to quick braking.

Furthermore, current technology does not know how to make real-world judgment calls. Various objects on the roadway require different judgments based on the context and current conditions. For instance, swerving to avoid a cardboard box causes unnecessary danger to the autonomous vehicle and other drivers. On the other hand, swerving is necessary to avoid hitting persons in the middle of the roadway. The judgment calls change upon the road conditions, the trajectory of other vehicles, the speed of the autonomous vehicle, and the speed and wheel direction of other vehicles.

Additionally, current technology is not suitable for an environment with other human drivers. Autonomous vehicles must be able to predict the behaviors of other drivers or pedestrians when reacting to changes in traffic patterns. One goal for acceptance of the autonomous vehicles in real life is to behave in a manner that allows proper interaction with other human drivers and vehicles. Human drivers often make decisions in traffic based on predictable human responses that are not necessarily conducive to machine rules. In other words, there is a technical problem with autonomous vehicles in that current autonomous driving vehicles behave too much like a machine. This behavior potentially causes accidents because other drivers do not anticipate certain acts performed by the autonomous vehicle.

The present document provides technical solutions for at least the above-described technical problems. For example, an efficient system for auditory assistant module is described to notify a test driver of critical moments in which human attention may be necessary. An auditory assistant module improves the focus of the driver on the immediate surroundings when necessary. Thus, the disclosure provides an auditory assistant module as a solution to the above problems, among other solutions.

Figure 1:
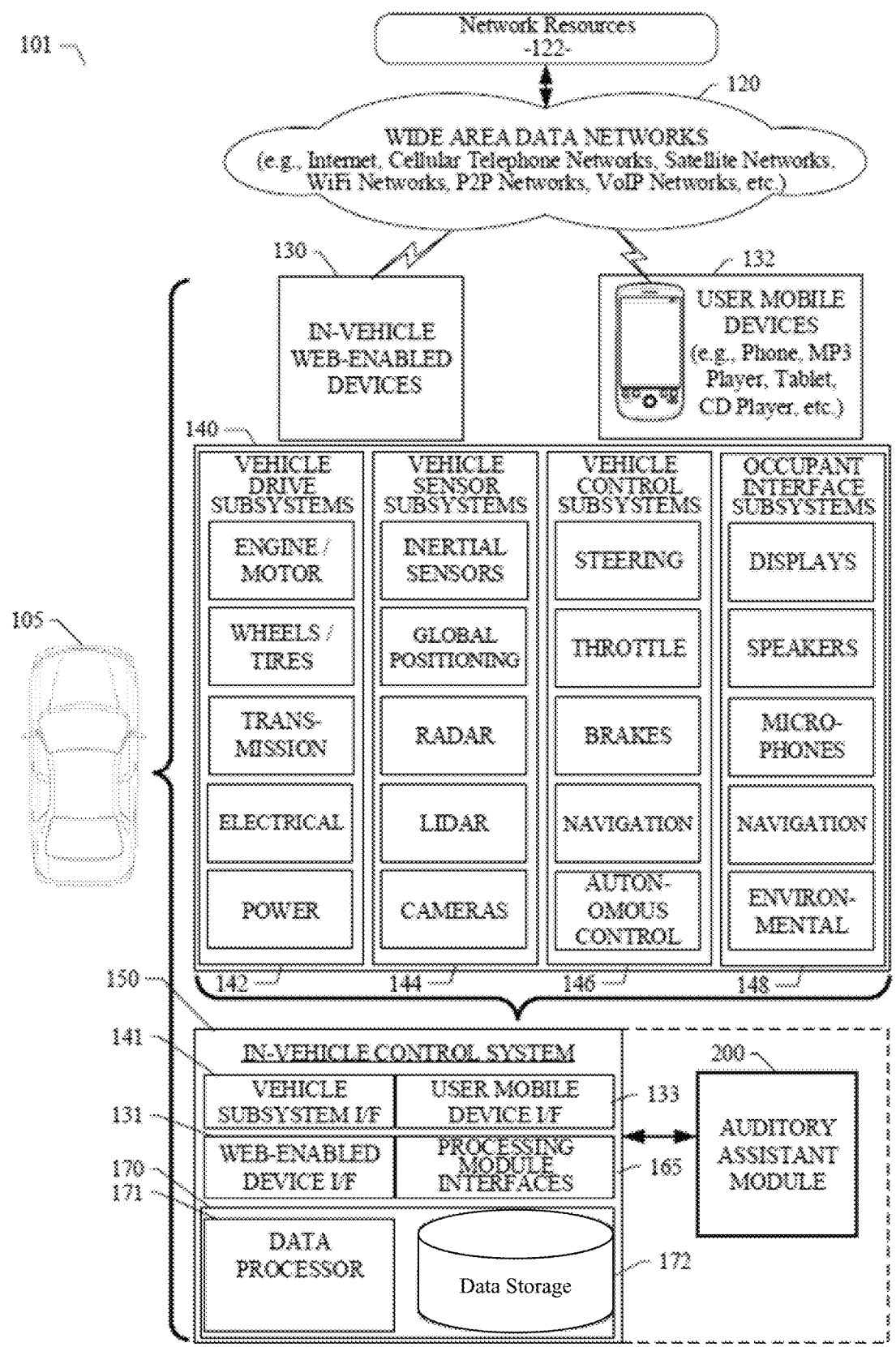
FIG. 1 illustrates a block diagram of an example ecosystem in which an auditory assistant module of an example embodiment can be implemented.

Referring now to FIG. 1, a block diagram illustrates an exemplary ecosystem 101 in which an in-vehicle control system 150 and an auditory assistant module 200 of an example embodiment can be implemented. These components are described in more detail below. Ecosystem 101 includes a variety of systems and components that can generate and/or deliver one or more sources of information/data and related services to the in-vehicle control system 150 and the auditory assistant module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 may include a computer and the auditory assistant module 200 executing in the computer can receive image and timing data input. As described in more detail below, the auditory assistant module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real-world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the auditory assistant module 200 for processing data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the auditory assistant module 200. In various example embodiments, a plurality of processing modules, configured similarly to auditory assistant module 200, can be provided for execution by data processor 171. As shown by the dashed lines in FIG. 1, the auditory assistant module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as web sites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing data input or data input analysis. Antennas can serve to connect the in-vehicle control system 150 and the auditory assistant module 200 with the data network 120 via cellular, satellite, radio, or other conventional signal reception mechanisms. Such cellular data networks are currently available (e.g., Verizon™ AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the auditory assistant module 200 can receive web-based data or content via an in-vehicle web-enabled device interface 131, which can be used to connect with the in-vehicle web-enabled device 130 and network 120. In this manner, the in-vehicle control system 150 and the auditory assistant module 200 can support a variety of network-connectable in-vehicle devices and systems from within a vehicle 105.

As shown in FIG. 1, the in-vehicle control system 150 and the auditory assistant module 200 can also receive data and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, and content for the in-vehicle control system 150 and the auditory assistant module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the auditory assistant module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the auditory assistant module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an 02 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the auditory assistant module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the auditory assistant module 200, the GPS transceiver, the RADAR, the LIDAR, the cameras, and other vehicle subsystems to determine the driving path or trajectory for the vehicle 105. The vehicle control subsystem 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 located in the vehicle 105 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short-range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer-readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control subsystem 146 in order to control the steering unit to avoid an obstacle detected by the vehicle sensor subsystem 144 and the auditory assistant module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and auditory assistant module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the auditory assistant module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the auditory assistant module 200 can be implemented as in-vehicle components of vehicle 105. In various example embodiments, the in-vehicle control system 150 and the image processing module 200 in data communication therewith can be implemented as integrated components or as separate components. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

System and Method for Auditory Notifications for Autonomous Vehicles

Figure 2:
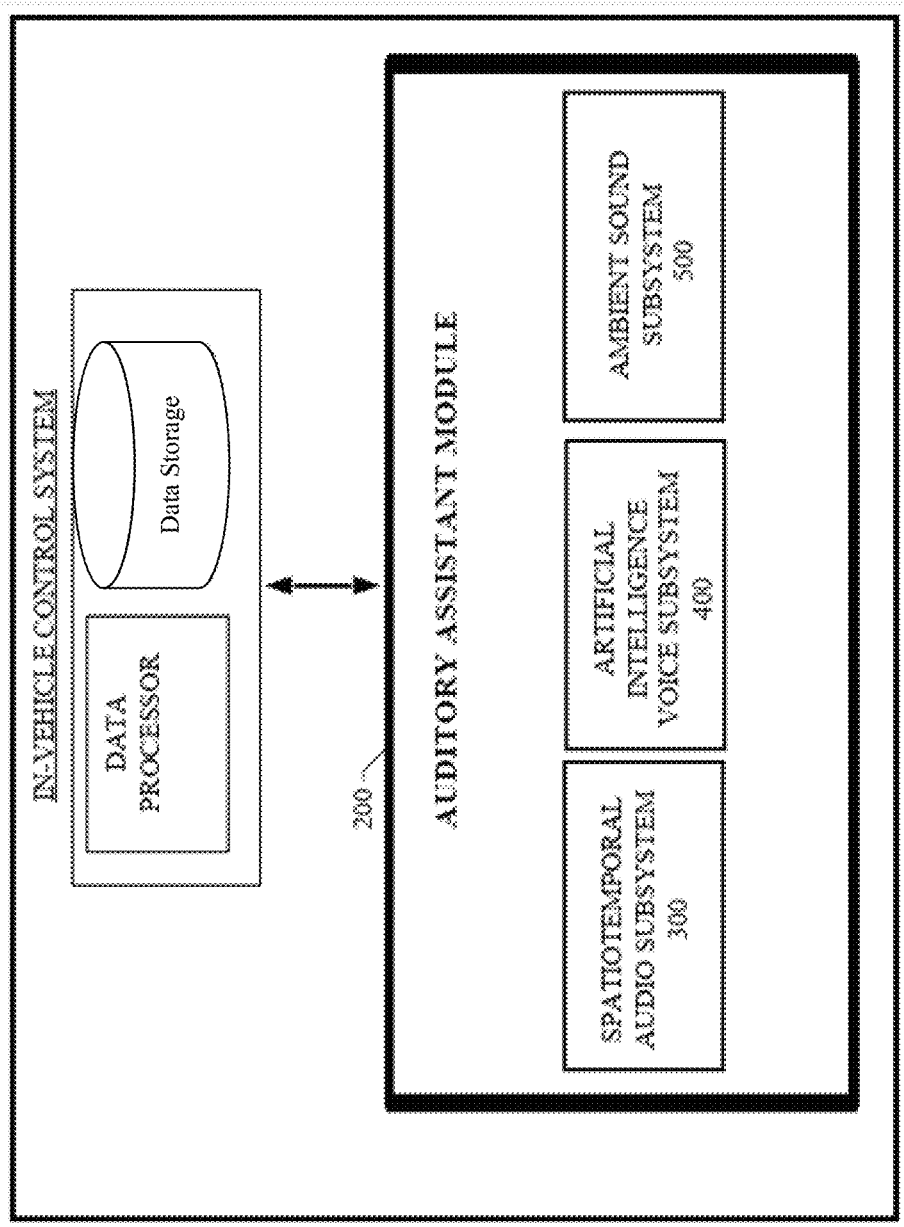
FIG. 2 shows an exemplary embodiment of an auditory assistant module.

FIG. 2 shows an exemplary embodiment of an in-vehicle control system comprising an auditory assistant module. The in-vehicle control system includes a processor and a data storage that can store instructions that, upon execution, enable the processor to perform the operations described for the one or more subsystems 300, 400, 500 of the auditory assistant module 200. The auditory assistant module may include any one or more of three subsystems: spatiotemporal audio subsystem 300, artificial intelligence voice subsystem 400, and ambient sound subsystem 500. Spatiotemporal audio subsystem 300, artificial intelligence voice subsystem 400, and ambient sound subsystem 500 are communicatively coupled to one another as well as to the auditory assistant module. Auditory assistant module 200 is communicatively coupled to the occupant interface subsystems. Auditory assistant module 200 is communicatively coupled to the vehicle sensor subsystems. Auditory assistant module is also communicatively coupled to network resources 122 and to wide area data networks 120, including in-vehicle web-enabled devices 130 and user mobile devices 132 shown in FIG. 1. The auditory assistant module allows drivers to focus on the road and avoid reading information and other results displayed on an autonomous driving system. Drivers may only need to hear the perception of the autonomous system and focus on the road.

Inputs of the auditory assistant module 200 include the vehicle sensor subsystems 144 and the occupant interface subsystems 148. More specifically, inputs of the auditory assistant module 200 include inertial sensors, global positioning, radar, LIDAR, and cameras connected to the autonomous vehicle. Exemplary inputs of occupant interface subsystems 148 include microphones, navigation, sensors detecting a driver condition, and data received from occupant electronic devices, such as mobile devices 132. Vehicle-to-vehicle communication data may also be received as an input. Such vehicle-to-vehicle communication data include direction of travel, trajectory path, speed, and abilities to accelerate, deaccelerate, and change lanes.

Outputs of the auditory assistant module 200 include the occupant interface subsystems 148. More specifically, the output of the auditory assistant module 200 includes at least one speaker capable of producing an auditory signal. In other embodiments, the input may be vehicle-to-vehicle communication data. Vehicle-to-vehicle communication data may include direction of travel, trajectory path, speed, and abilities to accelerate, deaccelerate, and change lanes.

Auditory assistant module 200 generates audio for a driver through the occupant interface subsystem. More specifically, the auditory assistant module 200 generates audio through at least one speaker. Audio includes monotone pitches (or frequencies), ambient noises, spatiotemporal audio patterns, audio signals, patterned audio signals, melodies, music, spoken words, voice notifications, and voice prompts.

Audio generated by auditory assistant module 200 may be organized into sound profiles. A sound profile is a sound clip including a noise, alarm, melody, or an audio clip. A sound profile may be a series or pattern of beeps or chimes conveying urgency to a driver of an autonomous vehicle. Some sound profiles may convey a recognized meaning such as certain ringtones, melodies, or alarms. Sound profile may continue to repeat or loop until discontinued by the auditory assistant module 200.

Audio is presented within the cabin of the autonomous vehicle through speaker. Speakers may be integrated into the dashboard, the central console, a navigation display, around the edges of the windshield, the steering wheel, the head rest, or another region of the autonomous vehicle. Audio may also be transmitted and presented through a wearable device or a mobile device. Audio may be presented as a vibration. as further described in the various techniques described below for the spatiotemporal audio subsystem 300, the artificial intelligence voice subsystem 400, and the ambient sound subsystem 500, in at least one implementation, an audio signal is transmitted via vehicle-to-vehicle communication to present information regarding the direction of travel, trajectory path, speed, and abilities to accelerate, deaccelerate, and change lanes of the autonomous vehicle. In this patent document, the techniques described for one audio system (e.g., spatiotemporal audio subsystem) of the auditory assistant module 200 may be used by another audio subsystem (e.g., artificial intelligence subsystem) of the auditory assistant module 200. Furthermore, this patent document describes audio related techniques to provide information to the driver and/or to indicate an increased potential danger determined over time by any one or more of the subsystems of the audio assistant module 200.

Figure 3:
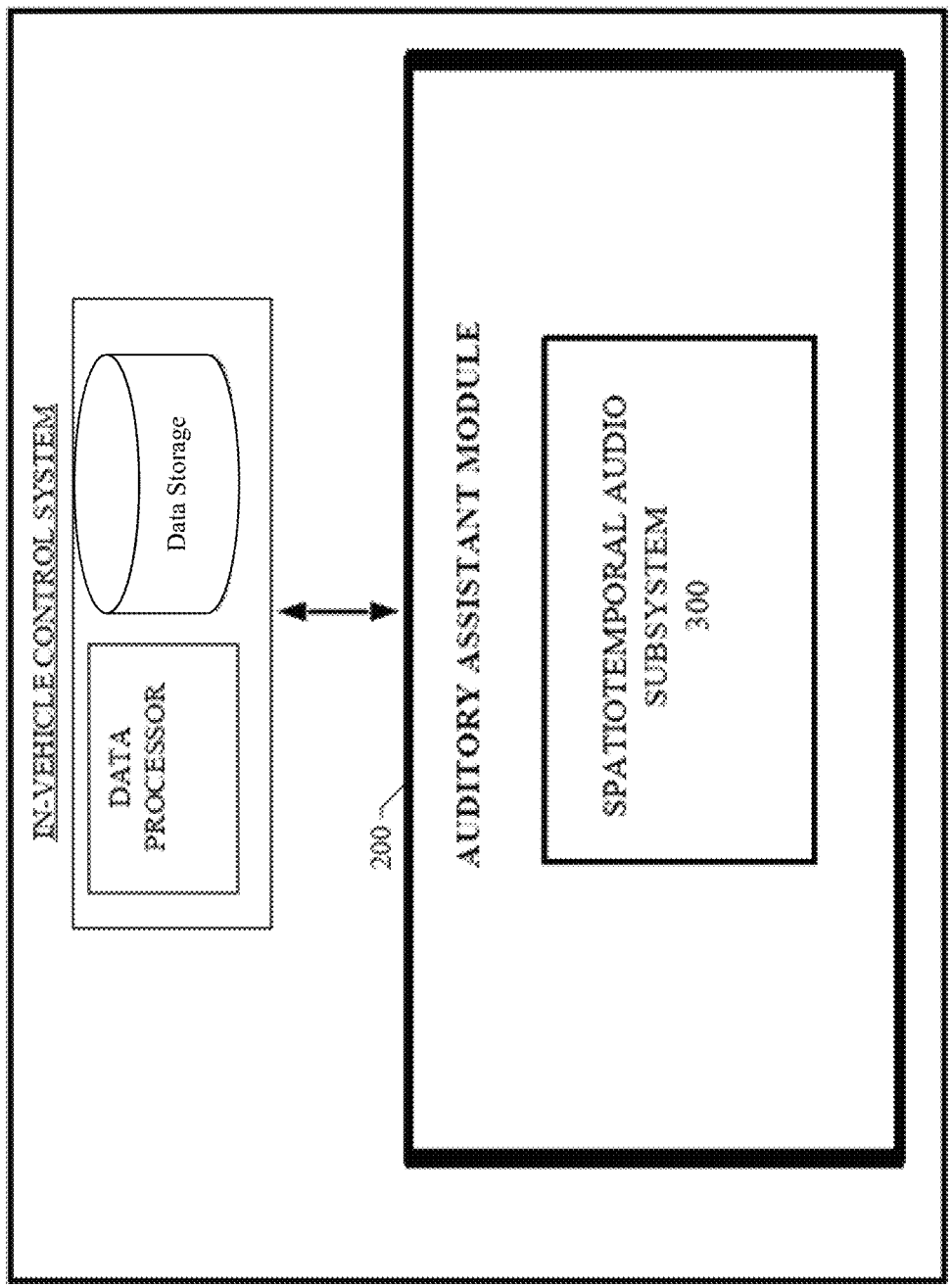
FIG. 3 shows an exemplary embodiment of a spatiotemporal audio subsystem.

FIG. 3 shows an exemplary embodiment of an in-vehicle control system comprising a spatiotemporal audio subsystem. The in-vehicle control system includes a processor and a data storage that can storage instructions that, upon execution, enable the processor to perform the operations described for the spatiotemporal audio subsystem 300. Spatiotemporal audio subsystem 300 is communicatively coupled with the occupant interface subsystems.

Spatiotemporal audio subsystem 300 is communicatively coupled to the vehicle sensor subsystems. Spatiotemporal audio subsystem 300 is also communicatively coupled to network resources 122 and to wide area data networks 120, including in-vehicle web-enabled devices 130 and user mobile devices 132.

The generated audio reproduced by the spatiotemporal audio subsystem 300 for the driver provides information to the driver regarding target objects. For example, the sound generated by the spatiotemporal audio subsystem 300 indicates to a driver the direction at which the target object approaches the autonomous vehicle. The sound generated by the spatiotemporal audio subsystem 300 imitates the direction at which the target object approaches the autonomous vehicle, indicating driver intervention or warning the driver of a potential collision. For example, if the spatiotemporal audio subsystem 300 determines, using inputs provided by the vehicle's sensors (as described below), that the target object is approaching the autonomous vehicle from a left of the autonomous vehicle and at a speed greater than a pre-determiend threshold, then the spatiotemporal audio subsystem 300 can have a speaker located to the left of the driver to generate audio that indicates that the target object is approaching the autonomous vehicle at a high speed. In another example, if the spatiotemporal audio subsystem 300 determines, using inputs provided by the vehicle's sensors, that a distance between the target object located in front of the autonomous vehicle is less than a pre-determined threshold, then the spatiotemporal audio subsystem 300 can have a speaker located to in the front of the driver to generate audio that indicates that the target object is located relative to the autonomous vehicle within a certain distance considered to be safe.

The spatiotemporal audio subsystem 300 assists in identifying potentially dangerous objects. In some embodiments, different potentially dangerous objects may be associated with different frequencies, tones, volume, melody pattern, and variation audio so that a driver can easily understand what type of dangerous object is being identified by the sound generated by the spatiotemporal audio subsystem. For example, if the spatiotemporal audio subsystem 300 determines, using inputs provided by the vehicle's sensors (as described below), that the autonomous vehicle is to be driven on a road having a tree branch that is located within a certain distance from the top of or front of the autonomous vehicle, then the spatiotemporal audio subsystem can generate an audio clip having a decreasing frequency which can indicate either that the tree branch is dangling close to where the autonomous vehicle is expected to be driven or that the autonomous vehicle may hit the tree branch. In another example, if the spatiotemporal audio subsystem 300 determines, using inputs provided by the vehicle's sensors (as described below), that a vehicle carrying a sign that states "oversize load" is located in a same lane or in an immediately adjacent lane on which the autonomous vehicle is driven, then the spatiotemporal audio subsystem can generate a melody pattern associated with an oversize load. Because humans are sensitive to audio indicators, they can respond more intuitively and quickly to approaching objects. Audio indicators convey a variety of information through frequencies, tones, volume, melody pattern, and variation audio.

Inputs of the spatiotemporal audio subsystem 300 include the vehicle sensor subsystems 144 and the occupant interface subsystems 148. More specifically, inputs of the spatiotemporal audio subsystem 300 include inertial sensors, global positioning, radar, LIDAR, and cameras connected to the autonomous vehicle. Exemplary inputs of occupant interface subsystems 148 include microphones, navigation, sensors detecting a driver condition, and data received from occupant electronic devices, such as mobile devices 132. Vehicle-to-vehicle communication data may also be received as an input. Such vehicle-to-vehicle communication data include direction of travel, trajectory path, speed, and abilities to accelerate, deaccelerate, and change lanes.

Outputs of the spatiotemporal audio subsystem 300 include the occupant interface subsystems 148. More specifically, the output of the spatiotemporal audio subsystem 300 includes at least one speaker capable of producing an auditory signal. In other embodiments, the input may be vehicle-to-vehicle communication data. Vehicle-to-vehicle communication data may include direction of travel, trajectory path, speed, and abilities to accelerate, deaccelerate, and change lanes. Multiple audio outputs may represent multiple target objects within the periphery of the autonomous vehicle.

Spatiotemporal audio subsystem 300 gathers information through the vehicle sensor subsystems about a target object outside the autonomous vehicle. The target object includes other vehicles, pedestrians, bicyclists, animals, traffic barriers, traffic signals, or an object in the roadway. The radar, lidar, cameras, and other units of the vehicle sensor subsystem gather information regarding the location, size, direction, and velocity of the target object. Vehicle-to-vehicle information may also be gathered to determining the location, size, direction, and velocity of the target object. The gathered information is then used to generate audio representing information pertaining to the target object or a behavior the driver should engage in response to the target object.

Spatiotemporal audio subsystem 300 utilizes spatiotemporal patterns and sound profiles to represent characteristics of the target object. In at least one implementation, the generated audio may represent a distance or proximity between the target object and where the autonomous vehicle is located at a first time. If, at a second time later than the first time, the spatiotemporal audio subsystem 300 determines that the distance between the target object and the autonomous vehicle decreases, then the spatiotemporal audio subsystem 300 may determine that the target object poses an increased potential danger and may increase the frequency at which the audio is generated to indicate that the distance between the target object and the autonomous vehicle has decreased. In at least one embodiment, if the spatiotemporal audio subsystem 300 determines determine that the target object poses an increased potential danger (e.g., if the distance between the target object and the autonomous vehicle decreases over time as explained above), then the spatiotemporal audio subsystem 300 increases the amplitude at which the audio is generated or increase pitch or frequency at which the audio is generated.

The sound profile may intensify according to the distance between the target object and the autonomous vehicle. The sound profile intensifies through a change in pitch, frequency, or amplitude. The sound profile may intensify by increasing the beats per minute or the rhythm of patterned tones or the melody. The sound profile may intensify by playing certain tones or melodies, indicating a warning, an approaching danger, or a certain road condition to the driver of the autonomous vehicle. The intensity of the sound profile may vary according to a road condition, an environment condition, or a driver condition. The intensity of the sound profile generated by the spatiotemporal audio subsystem 300 varies according to the speed of the target object as well as the speed of the autonomous vehicle. The spatiotemporal audio subsystem 300 may use stereophonic sounds to indicate the direction from which the target object is approaching, where stereophonic sounds (or stereo sound) use two or more speaker channels located in the autonomous vehicle. For example, if the spatiotemporal audio subsystem 300 determines that a vehicle is approaching the autonomous vehicle from the left of the driver, the spatiotemporal audio subsystem 300 can generate a sound by first using the left speaker channel located to the left of the driver, and as the target object continues to approach the autonomous vehicle from the left, the spatiotemporal audio subsystem 300 can continue to play the sound using the left speaker channel and can gradually increase the sound volume on a front speaker channel located to the front of the driver or a right speaker channel located to the right of the driver.

The generated audio may represent the size of the target object on or near the trajectory of the autonomous vehicle. In at least one embodiment, the frequency at which the audio is generated increases as the perceived size of the target object increases. In at least one embodiment, the amplitude at which the audio is generated increases as the perceived size of the target object increases. In at least one embodiment, the pitch or frequency at which the audio is generated increases as the perceived size of the target object increases.

The spatiotemporal audio subsystem 300 may determine that an increased size of a target object over time is associated with an increased potential danger and may cause a speaker in a driver's cabin of the autonomous vehicle to indicate that the size of the target object has increased over a pre-determined time period. The spatiotemporal audio subsystem can cause a speaker to indicate an increased size of a target object if the spatiotemporal audio subsystem 300, determines that the target object has increased in size and thus poses an increased potential danger. For example, if at a first time, the spatiotemporal audio subsystem 300 determines, using images provided by a camera located on the autonomous vehicle, that a target object occupies a first number of pixels or a first area in a first image obtained at a first time, and the spatiotemporal audio subsystem 300 determines that the same target object occupies a second number of pixels or a second area in a second image obtained at a second time later than the first time, where the second number of pixels or second area is greater than the first number of pixels or first area. The generated audio may represent the size of the target object on or near the trajectory of the autonomous vehicle. In at least one embodiment, the frequency at which the audio is generated increases as the perceived size of the target object increases. In at least one embodiment, the amplitude at which the audio is generated increases as the perceived size of the target object increases. In at least one embodiment, the pitch at which the audio is generated increases as the perceived size of the target object increases. In at least one embodiment, the sound profile intensifies according to the perceived size of the target object.

In at least one implementation, the generated audio may represent a direction from where the target object is situated and where the autonomous vehicle is located. In at least one embodiment, the generated audio is presented in one location in front, behind, to the right, to the left, or a combination thereof to represent the direction from which the target object is approaching. The location in which the generated audio is presented may switch from one area of presentation to a second area of presentation, representing a change in direction from which the target object is approaching. The method of switching presentation of audio may be implemented by fading the amplitude of one speaker and increasing the amplitude of another speaker to imitate the direction change of the target vehicle.

The speakers of the autonomous vehicle system may be configured to reproduce stereophonic sounds. Stereophonic sounds may be generated by reproducing two or more sound profiles based on the vehicle sensor subsystems through the speakers of the autonomous vehicle system. Stereophonic sounds may be generated by frequency shifting a sound profile and reproducing the original sound profile and the frequency-shifted sound profile. In at least one embodiment, a Doppler shift frequency of the incoming data from the vehicle sensor subsystems may be used to indicate the speed at which an object approaches.

Figure 9:
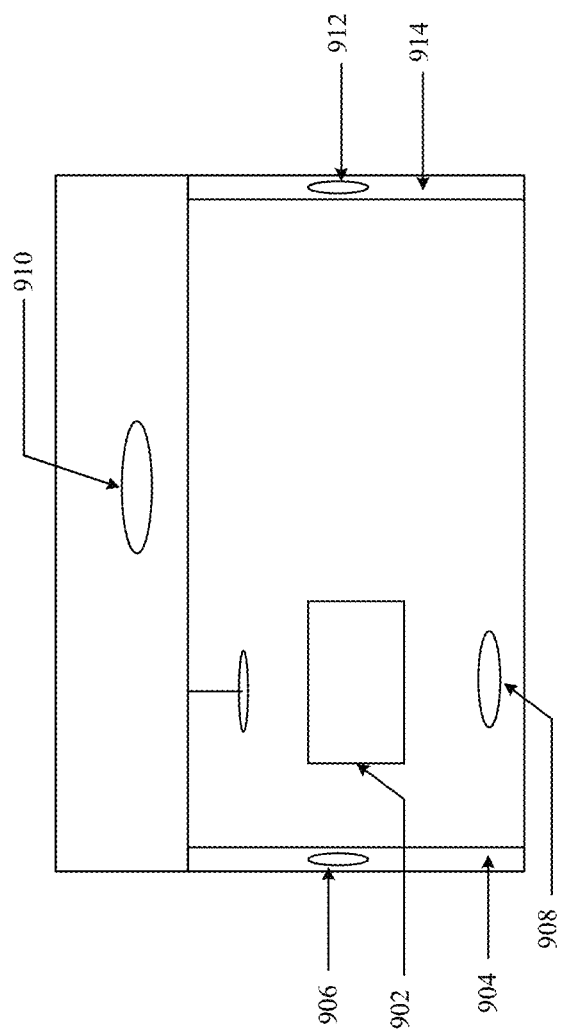
FIG. 9 shows a birds-eye view of a driver's cabin of an autonomous vehicle where a speaker layout can be used to generate stereophonic sounds.

FIG. 9 shows a birds-eye view of a driver's cabin of an autonomous vehicle where the speaker layout can be used to generate stereophonic sounds to allow the perception of sound from multiple directions (e.g., left, right, front, back, and their combinations) according to a driver situated in the autonomous vehicle. As shown in FIG. 9, a driver's cabin of the autonomous vehicle may have multiple speakers 906, 908, 910, and 912 located in different areas relative to the seat 902 of the driver. For example, a first speaker 906 may be located to the left of the driver's seat 902 on a left side panel 904 of the driver-side door of the autonomous vehicle, a second speaker 912 may be located to the right of the driver's seat 902 on a right side panel 914 of the passenger-side door of the autonomous vehicle, a third speaker 910 may be located to a front (e.g., on dashboard) of the driver's seat 902 in the cabin of the autonomous vehicle, and a fourth speaker 908 may be located to the rear of the driver's seat 902 (e.g., on a roof of the cabin behind the driver's seat 902). The stereophonic sound may be generated such that the sound is perceived as coming from a single direction (e.g., left speaker 906 if a target object is approaching from the left) or the sound is perceived from moving from one direction to a second direction (e.g., right speaker 912 to front speaker 910 to left speaker 906 if the target object drives in front of the autonomous vehicle and from the right to the left of the autonomous vehicle). In some embodiments, additional speakers may be located above and/or below the driver's seat 902.

The stereophonic sounds may also be coordinated to reproduce sounds representing multiple target objects. For example, if the spatiotemporal audio subsystem 300 determines that two target objects are located within a certain distance of the autonomous vehicle, then the spatiotemporal audio subsystem 300 first plays a first sound for a first target object that is closest to the autonomous vehicle and then plays a second sound for a second target object that is further away from the autonomous vehicle compared to the first target object. The first sound associated with the first target object may be different from the second sound associated with the second target object, if for example, the first target object is different from the second target object.

In at least one implementation, a stereophonic audio or sound profile is produced when the autonomous vehicle travels along an on-ramp approaching a highway. The stereophonic sound is generated to imitate the distance and speed at which the target object is located compared to the autonomous vehicle. As the distance decreases and the speed increases between the autonomous vehicle and the target object, the intensity of the sound profile increases.

Stereophonic sounds emitted from the speaker may indicate a speed at which the target object is approaching. The stereophonic sound imitates a high speed of the target object by utilizing frequency shifting techniques, Doppler shift techniques, or otherwise mimicking a fast transition between at least two speakers. The stereophonic sounds may transition from the back-to-front, front-to-back, right-to-left, or left-to-right to imitate target objects passing to the side, passing in the opposite directions, or crossing in front or behind the vehicle.

The spatiotemporal audio subsystem 300 may present a sound profile based on a particular road condition, an environmental condition, or a driving condition.

A road condition includes merging lanes, onramps and offramps, intersections, intersections without traffic signals or signs, construction zones, objects in the roadway, etc. The intensity of the sound profile generated by the spatiotemporal audio subsystem 300 varies according to the severity of the road condition.

For example, audio or a sound profile may intensify if the autonomous vehicle detects a construction zone. Audio or a sound profile may intensify if the autonomous sensor subsystems detect a merging car in the trajectory as the autonomous vehicle.

An environmental condition may be snow, rain, standing water, ice, hail, outside temperature, elevation, latitude or longitude, etc. The intensity of the sound profile generated by the spatiotemporal audio subsystem 300 varies according to the severity of the environmental condition. For example, audio or a sound profile may intensify if the autonomous vehicle detects snow. Audio or a sound profile may intensify if the autonomous sensor subsystems detect a standing water or icy roadways. A sound or sound profile may intensify by increasing volume of the speakers. Furthermore, the sound profile associated with standing water may be different from that used for icy roadways so that a driver can identify the environmental condition being identified by the sound profile.

Audio or a sound profile may intensify depending on whether a driver condition is satisfied. A driver condition includes a determination of whether the driver is in contact with the steering wheel, whether the driver is in contact with the foot brake or emergency brake, whether the driver is in contact with the accelerator, and whether the sight of the driver is directed towards the road. The intensity of the sound profile generated by the spatiotemporal audio subsystem 300 varies according to the severity of the driver condition.

For example, a sound profile may intensify if the autonomous vehicle detects that the sight of the driver is diverted from the road. For example, if the spatiotemporal audio subsystem 300, using images from a camera pointed towards the face of the driver, determines that the driver is looking away from the road for more than a pre-determined time (e.g., more than 2 seconds), then the spatiotemporal audio subsystem 300 can generate a sound profile that may intensity (e.g., volume increases) the longer the driver's face continues to face away from the road. In this example, the spatiotemporal audio subsystem 300 may determine an increased potential danger by determining, based on the images from the camera, that indicate that the driver face is not pointing towards the camera or towards the road after the pre-determined time.

In another example, if the spatiotemporal audio subsystem 300, using images from a camera pointed towards a road on which the autonomous vehicle is driven, determines that brakes need to be applied if a target vehicle is approaching the autonomous vehicle at a speed greater than a pre-determined threshold, then the spatiotemporal audio subsystem 300 may play a sound profile of a human voice warning the driver to "apply brakes." The sound profile of the human voice may intensify at a later time indicating an increased potential danger if the spatiotemporal audio subsystem determines that the driver has maintained the autonomous vehicle within the same trajectory of the road after receiving a verbal warning of the presence of the target object. A sound profile may intensify at a later time if the driver fails to engage the foot brake after receiving a verbal notification to do so. For example, a sound profile of a human voice using the term "apply brakes" may be repeated played as long as the driver fails to engage the foot brake, where each time the sound profile is played, the volume of the "apply brakes" sound profile is increased to indicate urgency of action that the driver needs to perform. In the above example, if the spatiotemporal audio subsystem 300 determines at a first time, based on sensor data provided by the vehicle's sensor(s), that a foot brake ought to be engaged (e.g., because a rate at which a distance between the autonomous vehicle and a target object is decreasing more than a pre-determined threshold), then the spatiotemporal audio subsystem 300 can cause a speaker to play the sound profile of a human voice, but if at a later time, the spatiotemporal audio subsystem 300 determines that the foot brake has still not been applied, then the spatiotemporal audio subsystem 300 may increase the volume or frequency or change the characteristic of the sound profile of the human voice to indicate an increased potential danger determined by the spatiotemporal audio sub system 300.

Audio may discontinue automatically when a road condition, an environmental condition, or a driving condition is satisfied or no longer present. Audio may discontinue automatically when the target object is no longer detected. Audio may discontinue when perceived danger is no longer present. Audio may discontinue automatically after a predetermined amount of time. Audio may discontinue upon receiving a signal via vehicle to vehicle communication.

Audio may discontinue manually by a human inside the vehicle. Audio may be manually discontinued by pressing a button presented as the user interface or otherwise through the occupant interface subsystem. Audio may be manually discontinued by presenting a passcode at the occupant interface subsystem. A voice response received via the microphone of the occupant interface subsystem may deactivate the audio.

Figure 4:
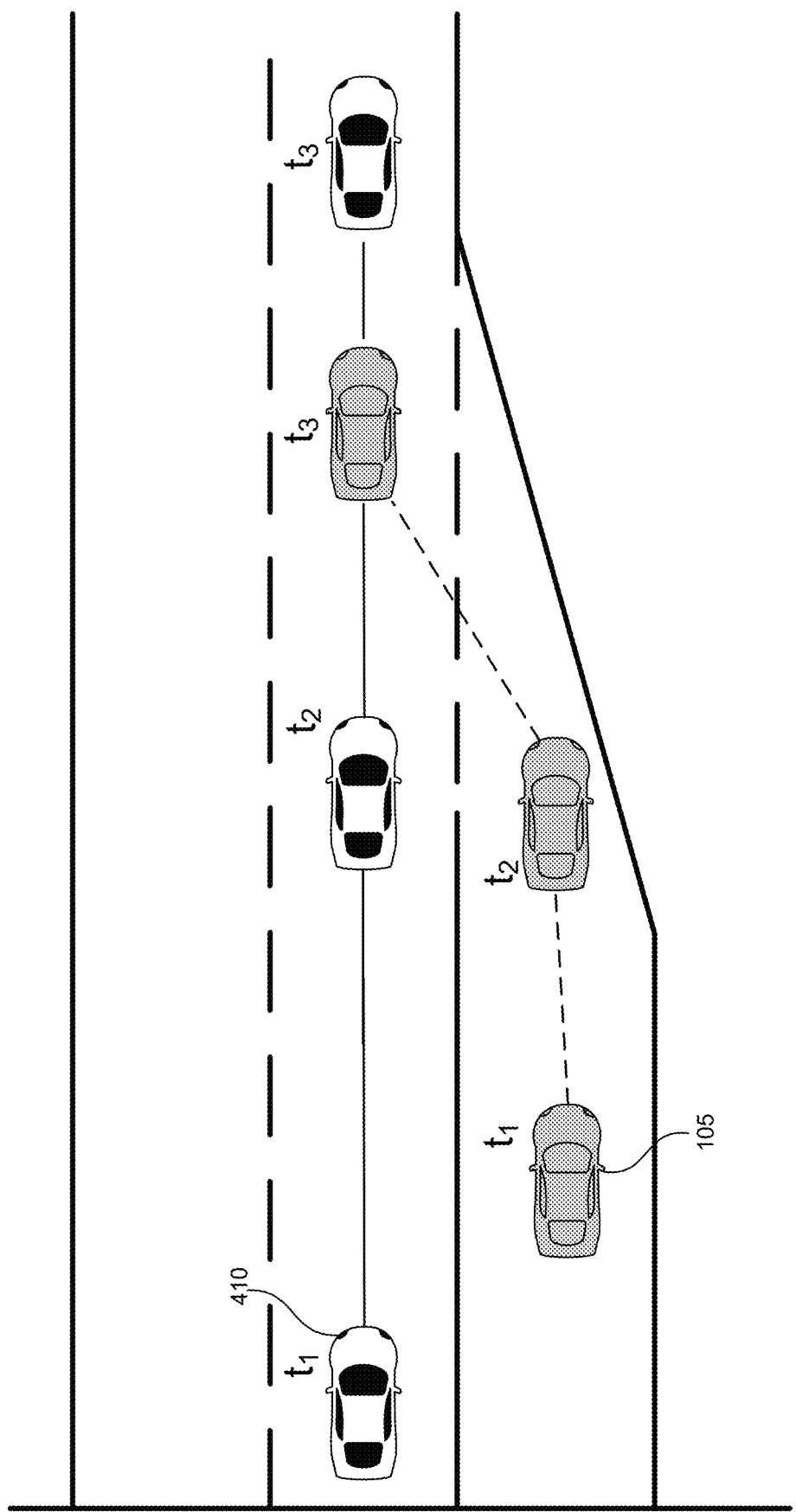
FIG. 4 shows an exemplary situation in which the spatiotemporal audio subsystem of the autonomous vehicle generates audio in response to a target object.

FIG. 4 shows an exemplary situation in which the spatiotemporal audio subsystem of the autonomous vehicle generates audio in response to a target object. Autonomous vehicle 105 is equipped with the auditory assistant module containing the spatiotemporal audio subsystem. Autonomous vehicle 105 has a trajectory to merge into a highway lane in which second vehicle 410 is traveling. Second vehicle 410 is traveling at a faster rate of speed than autonomous vehicle 105. The audio generated by the spatiotemporal audio subsystem responds differently at a first time interval (shown as t1 in FIG. 4), a second time interval (shown as t2 in FIG. 4), and a third time interval (shown as t3 in FIG. 4) in relation to the second vehicle 410. Optionally, the generated audio emits audio according to discrete states or conditions of the autonomous vehicle in relation to the second vehicle 410. Optionally, the generated audio gradually modifies the emitted audio during the transitioning between states or conditions of the autonomous vehicle in relation to the second vehicle 410.

At the first time interval t1, the second vehicle 410 is behind the autonomous vehicle and to the left. The spatiotemporal audio subsystem gathers information through the vehicle sensor subsystems about second vehicle 410. Gathered information includes the location, size, direction, and velocity of the second vehicle 410. In response to the gathered information, the spatiotemporal audio subsystem generates an audial pattern of beeps, chimes, notes, or another sound representing the direction from which the second vehicle 410 approaches. The spatiotemporal audio subsystem 300 increases the rhythm generated audial pattern as the second vehicle 410 approaches the autonomous vehicle. The generated audial pattern emanates from the speakers such that the audial pattern seems to originate from the back and left-hand area of the cabin (e.g., from a left speaker located to the left of the driver's seat and/or from a rear speaker located behind the driver's seat), mimicking the direction from which the second vehicle 410 approaches the autonomous vehicle. This effect may be accomplished through stereophonic sounds. The generated audial pattern can intensify based on the size, location, and velocity of the second vehicle 410. The generated audio pattern intensifies through volume, pitch, frequency, and rhythm as well as other methods discussed herein.

At the second time interval t2, the second vehicle 410 is alongside the autonomous vehicle to the left. The autonomous vehicle has continuously gathered information relating to the second vehicle 410 through the vehicle sensor subsystems. The rhythm of the audial pattern from the first interval of time increases due to the increased proximity of the second vehicle 410 to the autonomous vehicle. The spatiotemporal audio subsystem 300 increases the rhythm generated audial pattern as the second vehicle 410 approaches the autonomous vehicle because the spatiotemporal audio subsystem 300 determines, based on sensor data provided by the vehicle's sensor(s), that the second vehicle 410 located as position associated with second time interval t2 poses an increased potential danger compared to the location of the second vehicle 410 at time interval t1. Optionally, the sound profile of the audial pattern has also intensified since the first time interval t1 in pitch or frequency, volume, amplitude, or melody. The generated audial pattern emanates from the speakers such that the audial pattern seems to originate from the left-hand area of the cabin (e.g., from a left speaker located to the left of the driver's seat can play the audial pattern), mimicking the direction at which the second vehicle 410 passes the autonomous vehicle. This effect may be accomplished through stereophonic sounds. The generated audial pattern can intensify based on the size, location, trajectory, behavior, and velocity of the second vehicle 410. The generated audio pattern intensifies through volume, pitch, frequency, and rhythm as well as other methods discussed herein.

At the third time interval t3, the second vehicle 410 is in front of the autonomous vehicle separated by a short distance. The autonomous vehicle has continuously gathered information relating to the second vehicle 410 through the vehicle sensor subsystems. The audial pattern continues due to the short distance between the second vehicle 410 and the autonomous vehicle. In comparison to the second time interval t2, the rhythm of the audial pattern decreased due to the increased distance between the second vehicle 410 to the autonomous vehicle. Optionally, the intensity of the audial pattern has also decreased since the second time interval t2 in pitch or frequency, volume, amplitude, or melody. The generated audial pattern emanates from the speakers such that the audial pattern seems to originate from the front area of the cabin (e.g., a front speaker located on a dashboard in front of the driver can play the audial pattern), mimicking the direction at which the second vehicle 410 is traveling in relation to the autonomous vehicle. This effect may be accomplished through stereophonic sounds. In comparison to the second time interval t2, the intensity of the generated audial pattern is adjusted according to the changed location, behavior, direction, trajectory, and velocity of the second vehicle 410. The intensity of the generated audio pattern is adjusted through volume, pitch, frequency, and rhythm as well as other methods discussed herein.

Figure 5:
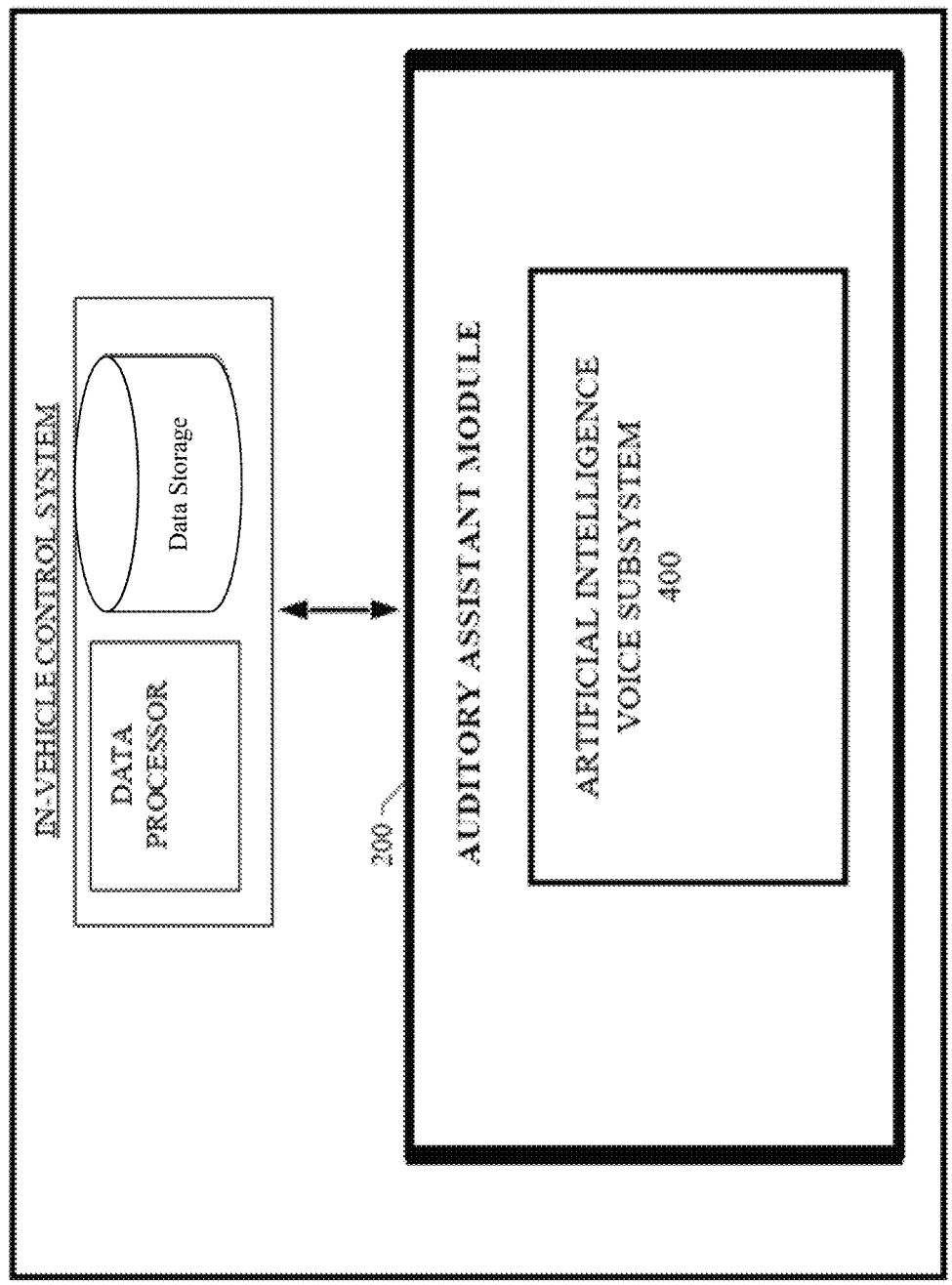
FIG. 5 shows an exemplary embodiment of an artificial intelligence voice subsystem.

FIG. 5 shows an exemplary embodiment of an in-vehicle control system comprising an artificial intelligence voice subsystem 400. The in-vehicle control system includes a processor and a data storage that can storage instructions that, upon execution, enable the processor to perform the operations described for the artificial intelligence voice subsystem 400. The artificial intelligence voice subsystem 400 is communicatively coupled with the occupant interface subsystems. Artificial intelligence voice subsystem 400 is communicatively coupled to the vehicle sensor subsystems. Artificial intelligence voice subsystem 400 is also communicatively coupled to network resources 122 and to wide area data networks 120, including in-vehicle web-enabled devices 130 and user mobile devices 132.

The generated audio reproduced by the artificial intelligence voice subsystem 400 for the driver provides information to the driver regarding target objects. The generated audio acts as a co-pilot through lingual communication by providing verbal notifications and warnings. For example, the prompts generated by artificial intelligence voice subsystem 400 may indicate to a driver through a human voice which direction the target object approaches the autonomous vehicle. The artificial voice subsystem can generate factual information of how close the target object is to the autonomous vehicle through a human voice. The artificial intelligence voice subsystem 400 can generate a verbal warning indicating that driver intervention is necessary through a human voice. The artificial intelligence voice subsystem 400 notifies test drivers about the current driving strategy and the future behavior of the autonomous driving system. Acting like a co-pilot, the auditory assistant module will keep communicating with drivers. The auditory assistant module provides simplified, easy-to-understand, and straight-to-the-point sentences for test drivers to guide drivers.

Inputs of the artificial intelligence voice subsystem 400 include the vehicle sensor subsystems 144 and the occupant interface subsystems 148. More specifically, inputs of the spatiotemporal audio subsystem include inertial sensors, global positioning, radar, LIDAR, and cameras connected to the autonomous vehicle. Exemplary inputs of occupant interface subsystems 148 include microphones, navigation, sensors detecting a driver condition, and data received from occupant electronic devices, such as mobile devices 132. Vehicle-to-vehicle communication data may also be received as an input. Such vehicle-to-vehicle communication data include direction of travel, trajectory path, speed, and abilities to accelerate, deaccelerate, and change lanes.

Outputs of the artificial intelligence voice subsystem 400 include the occupant interface subsystems 148. More specifically, the output of the artificial intelligence voice subsystem 400 includes at least one speaker capable of producing an auditory signal. In other embodiments, the input may be vehicle-to-vehicle communication data. Vehicle-to-vehicle communication data may include direction of travel, trajectory path, speed, and abilities to accelerate, deaccelerate, and change lanes. Multiple audio outputs may represent multiple target objects within the periphery of the autonomous vehicle.

Artificial intelligence voice subsystem 400 gathers information through the vehicle sensor subsystems about a target object outside the autonomous vehicle. The target object includes other vehicles, pedestrians, bicyclists, animals, traffic barriers, traffic signals, or an object in the roadway. The radar, lidar, cameras, and other units of the vehicle sensor subsystem gather information regarding the location, size, direction, and velocity of the target object. Vehicle-to-vehicle information may also be gathered to determining the location, size, direction, and velocity of the target object. The gathered information is then used to generate audio representing information pertaining to the target object or a behavior the driver should engage in response to the target object. More specifically, the audio represents auditory cues, notifications, and warnings presented phonetically as a human voice.

The artificial intelligence subsystem generates audio as a human voice. The human voice may provide information relating to a distance between the target object and where the autonomous vehicle is located. In at least one embodiment, the pace of the human voice increases as the distance between the target object and the autonomous vehicle decreases. In at least one embodiment, the amplitude of the human voice increases as the distance between the target object and the autonomous vehicle decreases. In at least one embodiment, the pitch of the human voice increases as the distance between the target object and the autonomous vehicle decreases. Other phonetics, such as intonation, rhythm, syllable structure, can be varied to convey urgency or information regarding the target object.

Using the example scenario described in FIG. 4, at the first time interval t1, the second vehicle 410 is behind the autonomous vehicle and to the left. The artificial intelligence subsystem can gather information through the vehicle sensor subsystems about second vehicle 410. Gathered information includes the location, size, direction, and velocity of the second vehicle 410. In response to the gathered information, the artificial intelligence subsystem generates an audio of human voice that informs the direction from which the second vehicle 410 approaches. For example, the artificial intelligence subsystem can generate an audio that states that "a vehicle is located on a left lane and has a speed of 70 mph."

The artificial intelligence subsystem may use the speaker configuration to indicate the direction from which the second vehicle 410 is approaching the autonomous vehicle. In the example scenario of FIG. 4, at a first time interval t1, the artificial intelligence subsystem can play audio stating that "a vehicle is located on a left lane" on a left speaker located to the left of the driver. The artificial intelligence subsystem can increase the volume of the audio generated by the artificial intelligence subsystem as the artificial intelligence subsystem determines that the second vehicle 410 approaches the autonomous vehicle. For example, at the second time interval t2, the artificial intelligence subsystem determines that the second vehicle 410 is located to the left of the autonomous vehicle 105, and at time interval t2, the artificial intelligence subsystem plays an audio that states that "warning! a vehicle is located to the left" which a volume higher than the audio played at time t1 because the artificial intelligence subsystem determines that a location of the second vehicle 410 at second time interval t2 poses an increased potential danger compared to the location of the second vehicle 410 at first time interval t1.

Generated audio of the artificial intelligence voice system may be organized into sound profiles. Sound profiles of the artificial intelligence voice system may be different languages, accents, genders, tones, or dialects. The sound profile may intensify according to the distance between the target object and the autonomous vehicle. The sound profile may intensify through a change in pitch, frequency, rhythm, or amplitude of the human voice. The sound profile may intensify by playing certain sound clips in addition to the human voice, indicating a warning, an approaching danger, or a certain road condition to the driver of the autonomous vehicle. The intensity of the sound profile may vary according to a road condition, an environment condition, or a driver condition as discussed further below. The intensity of the sound profile generated by the artificial intelligence voice system varies according to the speed of the target object as well as the speed of the autonomous vehicle. Sound profiles may be recorded and reproduced as stereophonic sounds to allow multiple voices to speak simultaneously or to have a voice speak from a particular region of the cabin of the autonomous vehicle.

The human voice of the artificial intelligence voice system may describe the approaching direction or location of the target object in relation to the autonomous vehicle. The human voice of the artificial intelligence voice system describes the make, model, body, size, shape, color, exterior, and license plate number. In at least one embodiment, the human voice is presented in one location in front, behind, to the right, to the left, or a combination thereof to represent the direction from which the target object is approaching. The location in which the human voice is presented may switch from one area of presentation to a second area of presentation, representing a change in direction from which the target object is approaching. The method of switching presentation of audio may be implemented by fading the amplitude of one speaker and increasing the amplitude of another speaker to imitate the direction change of the target vehicle.

In at least one implementation, the human voice may represent a direction from where the target object is situated and where the autonomous vehicle is located. The speakers of the autonomous vehicle system may be configured to reproduce stereophonic sounds. Stereophonic sounds may allow more than one voice to speak simultaneously and from different parts of the cabin of the autonomous vehicle. Stereophonic sounds may mimic a distant human voice or a close human voice. Stereophonic sounds may be reproduced in the cabin in relation to where the target object is located. This feature encourages the driver's attention to focus in the direction of the target object.

The stereophonic sounds may be generated to allow the human voice to emanate from multiple directions (e.g., left, right, front, back, and their combinations) according to the direction form which the target object approaches. The stereophonic sound may be generated such that the human voice is perceived as coming from a single direction or the sound is perceived from moving from one direction to a second direction. The stereophonic sounds may also be coordinated to reproduce multiple human voices representing multiple target objects.

The artificial intelligence voice subsystem 400 may present an instruction, notification, warning, or otherwise based on a particular road condition, an environmental condition, or a driving condition.

A road condition includes merging lanes, onramps and offramps, intersections, intersections without traffic signals or signs, construction zones, objects in the roadway, etc. Various instructions, notifications, warnings are provided based on the road condition. The intensity of the sound profile of the human voice generated by the artificial intelligence voice subsystem 400 varies according to the severity of the road condition.

For example, the sound profile of the human voice may intensify if the autonomous vehicle detects a construction zone. The sound profile of the human voice may intensify if the autonomous sensor subsystems detect a merging car in the trajectory as the autonomous vehicle.

An environmental condition may be snow, rain, standing water, ice, hail, outside temperature, elevation, latitude or longitude, etc. Various instructions, notifications, warnings are provided based on the environmental condition. The intensity of the sound profile of the human voice varies according to the severity of the environmental condition.

For example, the sound profile of the human voice may intensify if the autonomous vehicle detects snow. The sound profile of the human voice may intensify if the autonomous sensor subsystems detect a standing water or icy roadways.

The sound profile of the human voice may intensify depending on whether a driver condition is satisfied. A driver condition includes a determination of whether the driver is in contact with the steering wheel, whether the driver is in contact with the foot brake or emergency brake, whether the driver is in contact with the accelerator, and whether the sight of the driver is directed towards the road. Various instructions, notifications, warnings are provided based on the driver condition. The intensity of the sound profile of the human voice varies according to the severity of the driver condition.

For example, a sound profile of the human voice may intensify if the autonomous vehicle detects that the sight of the driver is diverted from the road. The sound profile of the human voice may intensify if the driver maintains the autonomous vehicle within the same trajectory of the road after receiving a verbal warning of the presence of the target object. A sound profile may intensify if the driver fails to engage the foot brake after receiving a notification from the generated human voice instructing to do so.

The generated human voice may discontinue automatically when a road condition, an environmental condition, or a driving condition is satisfied or no longer present. The generated human voice may discontinue automatically when the target object is no longer detected. The generated human voice may discontinue when perceived danger is no longer present. The generated human voice may discontinue automatically after a predetermined amount of time. The generated human voice may discontinue upon receiving a signal via vehicle to vehicle communication.

The generated human voice may discontinue manually by a human inside the vehicle. The generated human voice may be manually discontinued by pressing a button presented as the user interface or otherwise through the occupant interface subsystem. The generated human voice may be manually discontinued by presenting a passcode at the occupant interface subsystem. A voice response received via the microphone of the occupant interface subsystem may deactivate the generated human voice.

Figure 6:
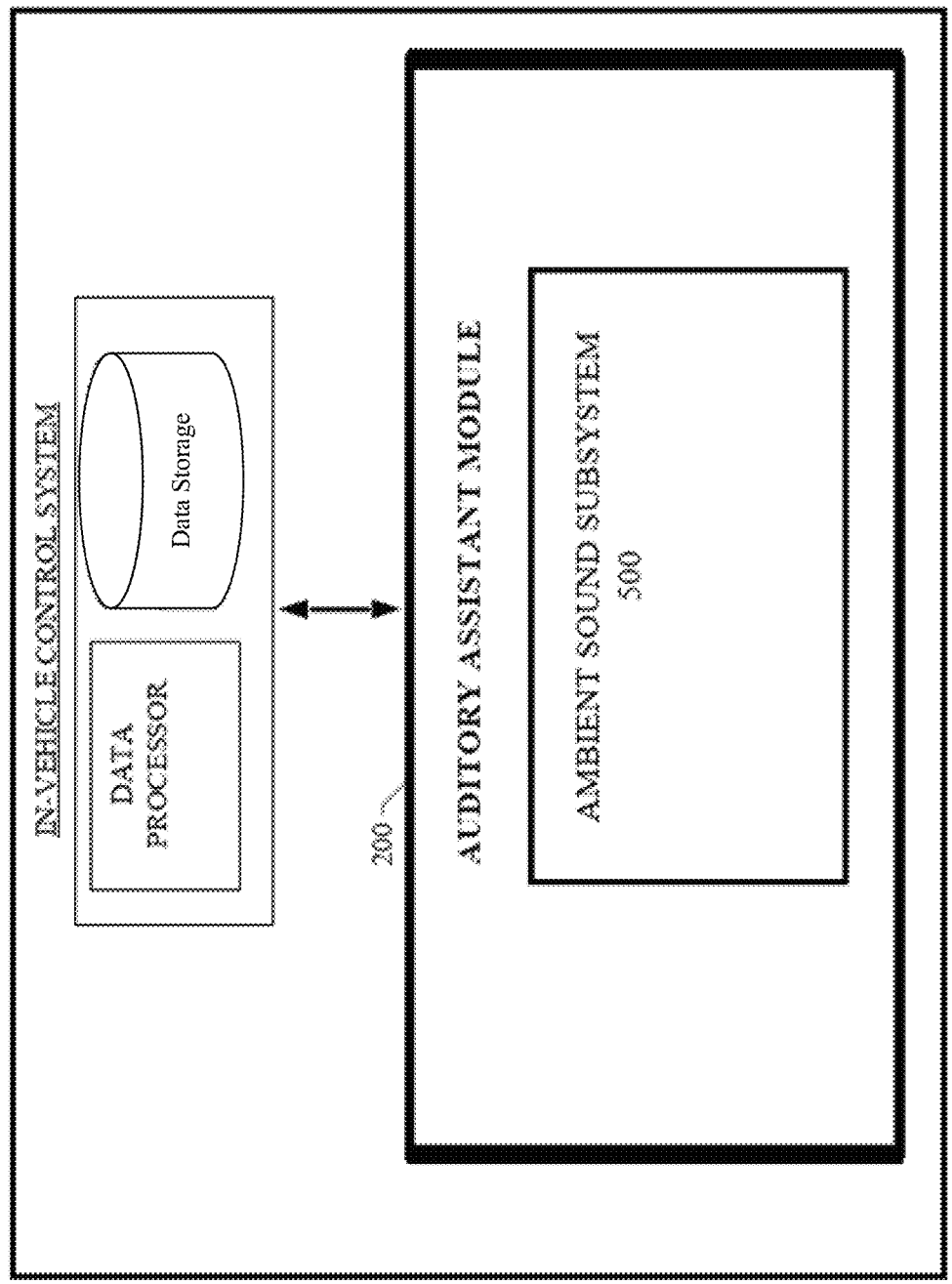
FIG. 6 shows an exemplary embodiment of an ambient sound subsystem

FIG. 6 shows an exemplary embodiment of an in-vehicle control system comprising an ambient sound subsystem. The in-vehicle control system includes a processor and a data storage that can storage instructions that, upon execution, enable the processor to perform the operations described for the ambient sound subsystem 500. Ambient sound subsystem 500 is communicatively coupled with the occupant interface subsystems. Ambient sound subsystem 500 is communicatively coupled to the vehicle sensor subsystems. Ambient sound subsystem 500 is also communicatively coupled to network resources 122 and to wide area data networks 120, including in-vehicle web-enabled devices 130 and user mobile devices 132.

The generated audio reproduced by the ambient sound subsystem 500 for the driver provides information to the driver regarding the autonomous vehicle environment that facilitates an assessment of the overall condition. The ambient sound subsystem 500 generated audio acts as an indicator of required driver attention. For example, ambient sound subsystem 500 may indicate to a driver through an ambient sound that attention to the road is minimal while driving on an isolated highway stretch. For example, based on images provided by cameras on the autonomous vehicle, if the ambient sound system determines that a road does not have vehicles within a certain distance of the autonomous vehicle (e.g., within 1000 meters), then the ambient sound subsystem can generate a melody or use human voice to play audio to indicate or state that the road is clear for a certain distance. In contrast, the ambient sound subsystem 500 may indicate to a driver through an ambient sound that attention is required while driving through a pedestrian-congested street. For example, based on images provided by cameras on the autonomous vehicle, if the ambient sound subsystem determines a presence of several pedestrians occupying an area on an image that is greater than a pre-determined threshold, then the ambient sound subsystem may play a sound to indicate the presence of several pedestrians. The ambient sound subsystem 500 can summarize the autonomous driving statuses and provide the right mood ambient sound for drivers. It assists drivers for hours of driving, which reminds drivers to pay attention and take actions at the right time period.

Inputs of the ambient sound subsystem 500 include the vehicle sensor subsystems 144 and the occupant interface subsystems 148. More specifically, inputs of the ambient sound subsystem 500 include inertial sensors, global positioning, radar, LIDAR, and cameras connected to the autonomous vehicle. Exemplary inputs of occupant interface subsystems 148 include microphones, navigation, sensors detecting a driver condition, and data received from occupant electronic devices, such as mobile devices 132. Vehicle-to-vehicle communication data may also be received as an input to the ambient sound subsystem 500. Such vehicle-to-vehicle communication data include direction of travel, trajectory path, speed, and abilities to accelerate, deaccelerate, and change lanes.

Outputs of the ambient sound subsystem 500 include the occupant interface subsystems 148. More specifically, the output of the ambient sound subsystem 500 includes at least one speaker capable of producing an auditory signal. In other embodiments, the input may be vehicle-to-vehicle communication data. Vehicle-to-vehicle communication data may include direction of travel, trajectory path, speed, and abilities to accelerate, deaccelerate, and change lanes. Multiple audio outputs may represent multiple target objects within the periphery of the autonomous vehicle.

Ambient sound subsystem 500 gathers information through the vehicle sensor subsystems about an autonomous vehicle environment containing target objects. The autonomous vehicle environment includes other vehicles, pedestrians, bicyclists, animals, traffic barriers, traffic signals, or an object in the roadway. The radar, lidar, cameras, and other units of the vehicle sensor subsystem gather information regarding the location, size, direction, and velocity of objects within the autonomous vehicle environment. Vehicle-to-vehicle information may also be gathered to determining the location, size, direction, and velocity of objects within the autonomous vehicle environment. The gathered information is then used to generate audio representing information pertaining to the autonomous vehicle environment or a behavior the driver should engage in response to the autonomous vehicle environment. More specifically, the audio represents ambient sounds designed to evoke a mood in the driver.

Ambient sound subsystem 500 generates audio as an ambient sound. The ambient sound may provide information relating to a distance between the target object and where the autonomous vehicle is located. In at least one embodiment, the pace of the ambient sound increases as the distance between the target object and the autonomous vehicle decreases. In at least one embodiment, the amplitude of the ambient sound increases as the distance between the target object and the autonomous vehicle decreases. In at least one embodiment, the pitch of the ambient sound increases as the distance between the target object and the autonomous vehicle decreases.

Generated audio of the ambient sound subsystem 500 may be organized into sound profiles. The sound profile of the ambient sound may intensify according to the danger presented of the autonomous vehicle environment. For example, the sound profile of the ambient sound may intensify based on a distance between the target object and the autonomous vehicle. The sound profile of the ambient sound may intensify through a change in pitch, frequency, rhythm, or amplitude of the ambient sound. The intensity of the sound profile may vary according to a road condition, an environment condition, or a driver condition as discussed further below. The intensity of the sound profile generated by the ambient sound subsystem 500 varies according to the danger of the autonomous vehicle environment as well as the speed of the autonomous vehicle. Sound profiles may be recorded and reproduced as stereophonic sounds to allow multiple ambient sounds or to have an ambient sound from a particular region of the cabin of the autonomous vehicle.

The ambient sound of the ambient sound subsystem 500 matches the autonomous vehicle environment. For example, if the ambient sound subsystem 500 determines, using sensor data provided by sensors on the autonomous vehicle, a presence of rain in an environment in which the autonomous vehicle is driven, then the ambient sound subsystem 500 may play audio clip of rain. In another example, if the ambient sound subsystem 500 determines, using sensor data provided by sensors on the autonomous vehicle, a presence of standing water on the road on which the autonomous vehicle will be driven, then the ambient sound subsystem 500 may play audio clip of a human voice that states "slippery conditions ahead."

In at least one embodiment, the ambient sound is presented in one location in front, behind, to the right, to the left, or a combination thereof to represent the direction from which the target object in the autonomous vehicle environment is approaching. The location in which the ambient sound is presented may switch from one area of presentation to a second area of presentation, representing a change in direction from which the target object in the autonomous vehicle environment is approaching. The method of switching presentation of the ambient sound may be implemented by fading the amplitude of one speaker and increasing the amplitude of another speaker to imitate the direction change of the target object of the autonomous vehicle environment. In at least one implementation, the ambient sound where the autonomous vehicle is located.

The speakers of the autonomous vehicle system may be configured to reproduce stereophonic sounds. Stereophonic sounds may allow more than one voice to speak simultaneously and from different parts of the cabin of the autonomous vehicle. Stereophonic sounds may mimic a distant ambient sound or a close ambient sound. Stereophonic sounds may be reproduced in the cabin in relation to the autonomous vehicle environment. This feature encourages the driver's attention to focus in the direction of the target object in the autonomous vehicle environment.

The ambient sound subsystem 500 may present an instruction, notification, warning, or otherwise based on a particular road condition, an environmental condition, or a driving condition. A road condition includes merging lanes, onramps and offramps, intersections, intersections without traffic signals or signs, construction zones, objects in the roadway, etc. Various instructions, notifications, warnings are provided based on the road condition. The intensity of the sound profile of the ambient sound generated by the ambient sound subsystem 500 varies according to the severity of the road condition. For example, the sound profile of the ambient sound may intensify if the autonomous vehicle detects a construction zone. The sound profile of the ambient sound may intensify if the autonomous sensor subsystems detect a merging car or expects a car to merge in the trajectory as the autonomous vehicle.

An environmental condition may be snow, rain, standing water, ice, hail, outside temperature, elevation, latitude or longitude, etc. Various instructions, notifications, warnings are provided based on the environmental condition. The intensity of the sound profile of the ambient sound varies according to the severity of the environmental condition.

For example, the sound profile of the ambient sound may intensify if the autonomous vehicle detects snow. The sound profile of the ambient sound may intensify if the autonomous sensor subsystems detect a standing water or icy roadways.

The sound profile of the ambient sound may intensify depending on whether a driver condition is satisfied. A driver condition includes a determination of whether the driver is in contact with the steering wheel, whether the driver is in contact with the foot brake or emergency brake, whether the driver is in contact with the accelerator, and whether the sight of the driver is directed towards the road. Various instructions, notifications, warnings are provided based on the driver condition. The intensity of the sound profile of the ambient sound varies according to the severity of the driver condition.

For example, a sound profile of the ambient sound may intensify if the autonomous vehicle detects that the sight of the driver is diverted from the road. The sound profile of the ambient sound may intensify if the driver maintains the autonomous vehicle within the same trajectory of the road after receiving a verbal warning of the presence of the target object. A sound profile may intensify if the driver fails to engage the foot brake after receiving a notification from the generated ambient sound instructing to do so.

The generated ambient sound may discontinue automatically when a road condition, an environmental condition, or a driving condition is satisfied or no longer present. The generated ambient sound may discontinue automatically when the target object is no longer detected. The generated ambient sound may discontinue when perceived danger is no longer present. The generated ambient sound may discontinue automatically after a predetermined amount of time. The generated ambient sound may discontinue upon receiving a signal via vehicle to vehicle communication.

The generated ambient sound may discontinue manually by a human inside the vehicle. The generated ambient sound may be manually discontinued by pressing a button presented as the user interface or otherwise through the occupant interface subsystem. The generated ambient sound may be manually discontinued by presenting a passcode at the occupant interface subsystem. A voice response received via the microphone of the occupant interface subsystem may deactivate the generated ambient sound.

As used herein and unless specified otherwise, the term "mobile device" includes any computing or communications device that can communicate with the in-vehicle control system 150 and/or the image processing module 200 described herein to obtain read or write access to data signals, messages, or content communicated via any mode of data communications. In many cases, the mobile device 132 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 132 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 132 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150 and/or the auditory assistant module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the auditory assistant module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the auditory assistant module 200 can be implemented using systems that enhance the security of the execution environment, thereby improving security and reducing the possibility that the in-vehicle control system 150 and/or the auditory assistant module 200 and the related services could be compromised by viruses or malware. For example, the in-vehicle control system 150 and/or the auditory assistant module 200 can be implemented using a Trusted Execution Environment, which can ensure that sensitive data is stored, processed, and communicated in a secure way.

Figure 7:
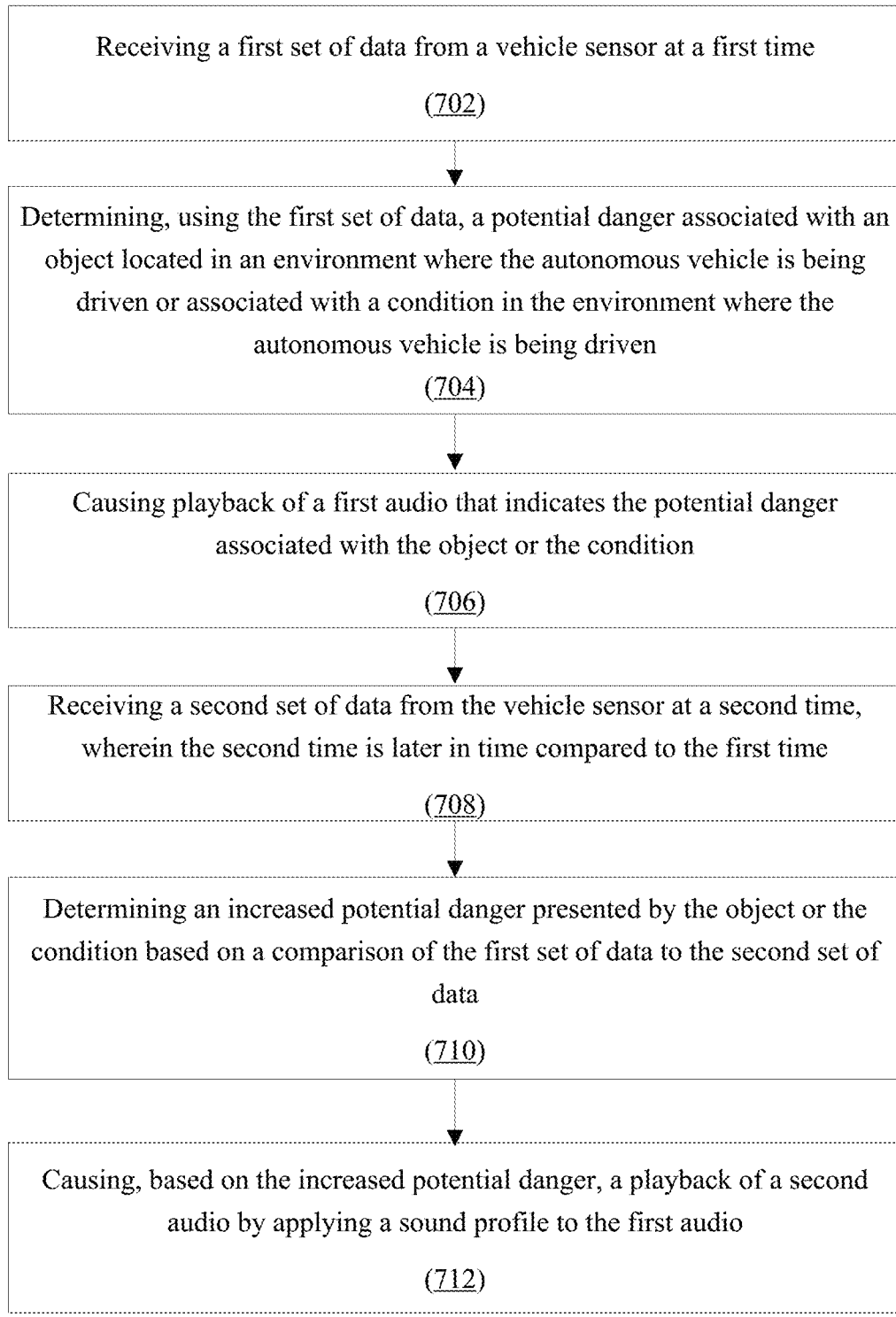
FIG. 7 is a process flow diagram illustrating an example embodiment of a system and method for providing notifications to a driver.

FIG. 7 is a process flow diagram illustrating an example embodiment of a system and method for providing notifications to a driver. Operation 702 includes receiving a first set of data from a vehicle sensor at a first time, where the vehicle sensor is located on or in the autonomous vehicle. Operation 704 includes determining, using the first set of data, a potential danger associated with an object located in an environment where the autonomous vehicle is being driven or associated with a condition in the environment where the autonomous vehicle is being driven. Operation 706 includes causing playback of a first audio that indicates the potential danger associated with the object or the condition. Operation 708 includes receiving a second set of data from the vehicle sensor at a second time, wherein the second time is later in time compared to the first time. Operation 710 includes determining an increased potential danger presented by the object or the condition based on a comparison of the first set of data to the second set of data. Operation 712 includes causing, based on the increased potential danger, a playback of a second audio by applying a sound profile to the first audio.

In some embodiments, the first audio is associated with a first spatiotemporal pattern configured to audibly indicates a first distance between the object and the autonomous vehicle, the second audio is associated with a second spatiotemporal pattern configured to audibly indicates a second distance between the object and the autonomous vehicle, and the first distance is greater than the second distance. In some embodiments, the second spatiotemporal pattern has a volume or frequency or a number of tones or a number of beats that is greater than that of the first spatiotemporal pattern. In some embodiments, the vehicle sensor includes a camera, a Radar, or a Light Detection and Ranging (LiDAR) sensor.

In some embodiments, the first audio and the second audio are played on one or more speakers in the autonomous vehicle based on locations of the object relative to the autonomous vehicle at a first time and at the second time. In some embodiments, the condition indicates that a vehicle is expected to merge onto a lane on a road, where the lane is associated with a trajectory of the autonomous vehicle.

In some embodiments, the first audio or the second audio indicates a position of the object relative to the autonomous vehicle. In some embodiments, the first audio is played on a first speaker located in the autonomous vehicle, and the first speaker is associated with a first location where the object is located relative to that of the autonomous vehicle at the first time. In some embodiments, the second audio is played on a second speaker located in the autonomous vehicle, and the second speaker is associated with a second location where the object is located relative to that of the autonomous vehicle at the second time. In some embodiments, the condition includes an environmental condition of the environment in which the autonomous vehicle is driven.

In some embodiments, the causing the playback of the second audio includes applying, to the first audio, the sound profile that intensifies the first audio by modifying a frequency or an amplitude of the first audio and thereby causes the playback of the second audio.

In some embodiments, the first audio or the second audio uses words to indicate a characteristic of the object or the condition. In some embodiments, the object includes a vehicle, and the characteristic of the object includes a model of the vehicle or a license plate number of the vehicle. In some embodiments, the condition includes a weather condition in the environment where the autonomous vehicle is driven, and the characteristic of the condition includes a current weather, a temperature, or an elevation where the autonomous vehicle is driven. In some embodiments, the determining the potential danger associated with the object includes determining that the object is approaching the autonomous vehicle at a speed greater than a pre-determined threshold, and the determining the increased potential danger of the condition includes determining that a brake of the autonomous vehicle has not been depressed since the first time until the second time.

In some embodiments, the condition includes a driver condition indicative of a level of attentiveness of a driver in the autonomous vehicle. In some embodiments, the causing the playback of the second audio includes applying, to the first audio, the sound profile that intensifies the first audio by modifying a rhythm or a melody of the first audio and thereby causing the playback of the second audio. In some embodiments, the method of FIG. 7 further includes receiving a third set of data from the vehicle sensor at a third time; determining, using the third set of data, a presence of a plurality of pedestrians in the environment where the autonomous vehicle is being driven; and causing playback of a third audio that indicates the presence of the plurality of pedestrians.

Figure 8:
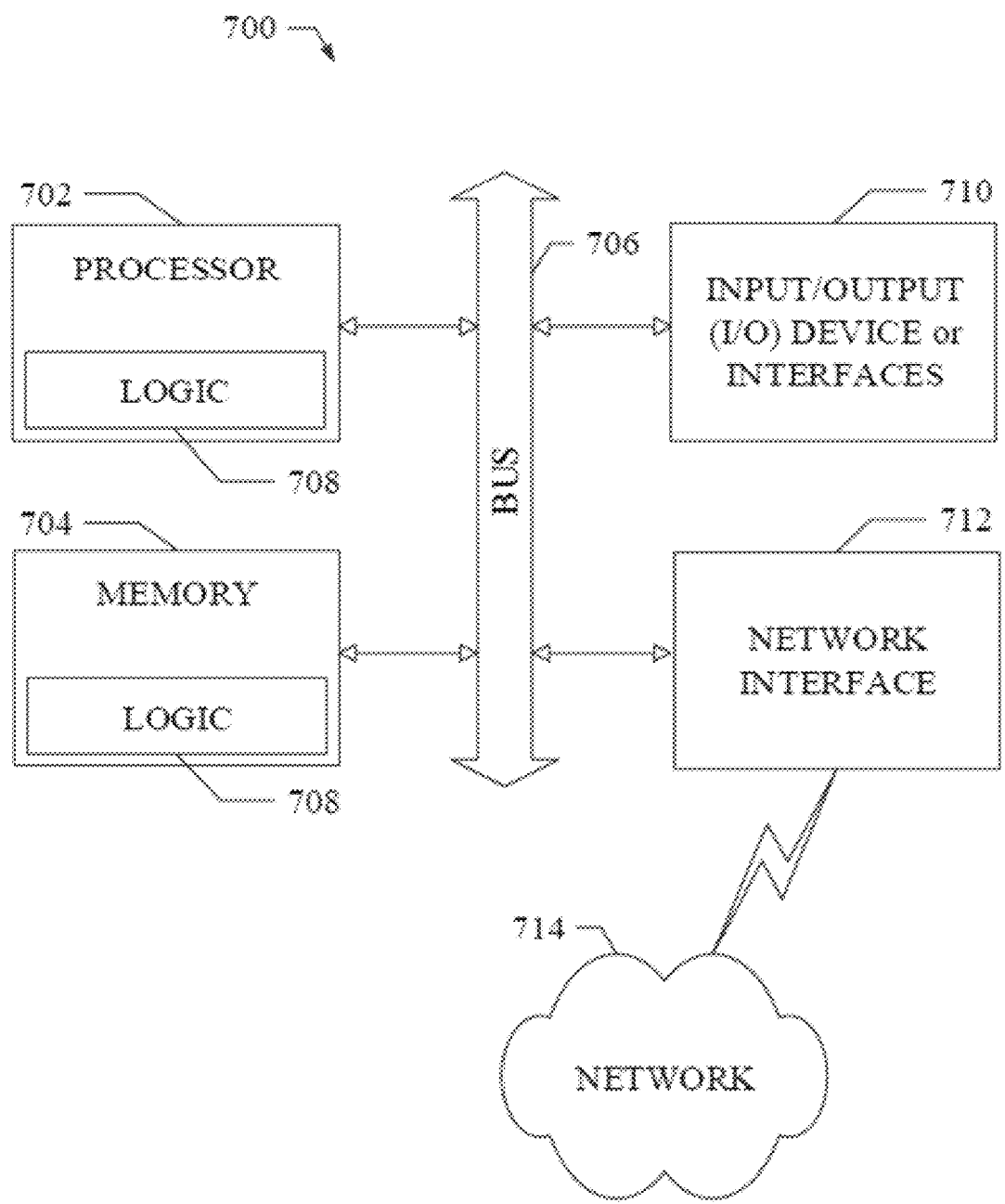
FIG. 8 shows a diagrammatic representation of a machine in the example form of a computer system within which a set of instructions when executed may cause the machine to perform any one or more of the methodologies discussed herein.

FIG. 8 shows a diagrammatic representation of a machine in the example form of a computing system 700 within which a set of instructions when executed and/or processing logic when activated may cause the machine to perform any one or more of the methodologies described and/or claimed herein, such as in FIG. 7. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In the description in this patent document provided, for purposes of explanation, numerous specific details are set forth in order to provide a thorough understanding of the various embodiments. It should be understood that other embodiments may be utilized, and structural changes may be made without departing from the scope of the disclosed subject matter. Any combination of the following features and elements is contemplated to implement and practice the disclosure. In the description, common or similar features may be designated by common reference numbers. As used herein, "exemplary" may indicate an example, an implementation, or an aspect, and should not be construed as limiting or as indicating a preference or a preferred implementation.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

While the foregoing is directed to implementations of the present disclosure, other and further implementations of the disclosure may be devised without departing from the basic scope thereof, and the scope thereof is determined by the claims that follow.

What is claimed is:

1. A method providing informational audio in an autonomous vehicle comprising:
    receiving a first set of data from a vehicle sensor at a first time, wherein the vehicle sensor is located on or in the autonomous vehicle;
    determining, using the first set of data, a potential danger associated with an object located in an environment where the autonomous vehicle is being driven or associated with a condition in the environment where the autonomous vehicle is being driven;
    causing playback of a first audio that indicates the potential danger associated with the object or the condition;
    receiving a second set of data from the vehicle sensor at a second time, wherein the second time is later in time compared to the first time;
    determining an increased potential danger presented by the object or the condition based on a comparison of the first set of data to the second set of data; and
    causing, based on the increased potential danger, a playback of a second audio by applying a sound profile to the first audio,
    wherein the condition includes a driver condition indicative of a level of attentiveness of a driver in the autonomous vehicle.

2. The method of claim 1,
    wherein the first audio is associated with a first spatiotemporal pattern configured to audibly indicates a first distance between the object and the autonomous vehicle,
    wherein the second audio is associated with a second spatiotemporal pattern configured to audibly indicate a second distance between the object and the autonomous vehicle, and
    wherein the first distance is greater than the second distance.

3. The method of claim 2, wherein the second spatiotemporal pattern has a volume or frequency or a number of tones or a number of beats that is greater than that of the first spatiotemporal pattern.

4. The method of claim 1, wherein the vehicle sensor includes a camera, a Radar, or a Light Detection and Ranging (LiDAR) sensor.

5. The method of claim 1, wherein the first audio and the second audio are played on one or more speakers in the autonomous vehicle based on locations of the object relative to the autonomous vehicle at a first time and at the second time.

6. The method of claim 1, wherein the condition indicates that a vehicle is expected to merge onto a lane on a road, and wherein the lane is associated with a trajectory of the autonomous vehicle.

7. A system comprising:
    at least one processor configured to:
        receive a first set of data from a vehicle sensor;
        receive a first set of data from a vehicle sensor at a first time, wherein the vehicle sensor is located on or in the autonomous vehicle;
        determine, using the first set of data, a potential danger associated with an object located in an environment where the autonomous vehicle is being driven or associated with a condition in the environment where the autonomous vehicle is being driven, the condition including a driver condition indicative of a level of attentiveness of a driver in the autonomous vehicle;
        cause playback of a first audio that indicates the potential danger associated with the object or the condition;
        receive a second set of data from the vehicle sensor at a second time, wherein the second time is later in time compared to the first time;
        determine an increased potential danger presented by the object or the condition based on a comparison of the first set of data to the second set of data; and
        cause, based on the increased potential danger, a playback of a second audio by applying a sound profile to the first audio.

8. The system of claim 7, wherein the first audio or the second audio indicates a position of the object relative to the autonomous vehicle.

9. The system of claim 7,
    wherein the first audio is played on a first speaker located in the autonomous vehicle, and
    wherein the first speaker is associated with a first location where the object is located relative to that of the autonomous vehicle at the first time.

10. The system of claim 9,
    wherein the second audio is played on a second speaker located in the autonomous vehicle, and
    wherein the second speaker is associated with a second location where the object is located relative to that of the autonomous vehicle at the second time.

11. The system of claim 7, wherein the condition includes an environmental condition of the environment in which the autonomous vehicle is driven.

12. The system of claim 7, wherein the causing the playback of the second audio includes applying, to the first audio, the sound profile that intensifies the first audio by modifying a frequency or an amplitude of the first audio and thereby causes the playback of the second audio.

13. A non-transitory computer-readable medium including instructions, that, when executed causes a system to provide informational audio in an autonomous vehicle, the system being configured to performing the steps of:
    receiving a first set of data from a vehicle sensor at a first time, wherein the vehicle sensor is located on or in the autonomous vehicle;
    determining, using the first set of data, a potential danger associated with an object located in an environment where the autonomous vehicle is being driven or associated with a condition in the environment where the autonomous vehicle is being driven;
    causing playback of a first audio that indicates the potential danger associated with the object or the condition;
    receiving a second set of data from the vehicle sensor at a second time, wherein the second time is later in time compared to the first time;
    determining an increased potential danger presented by the object or the condition based on a comparison of the first set of data to the second set of data; and
    causing, based on the increased potential danger, a playback of a second audio by applying a sound profile to the first audio,
    wherein the condition includes a driver condition indicative of a level of attentiveness of a driver in the autonomous vehicle.

14. The non-transitory computer-readable medium of claim 13,
wherein the first audio or the second audio uses words to indicate a characteristic of the object or the condition.

15. The non-transitory computer-readable medium of claim 14,
wherein the object includes a vehicle, and
wherein the characteristic of the object includes a model of the vehicle or a license plate number of the vehicle.

16. The non-transitory computer-readable medium of claim 14,
wherein the condition includes a weather condition in the environment where the autonomous vehicle is driven, and
wherein the characteristic of the condition includes a current weather, a temperature, or an elevation where the autonomous vehicle is driven.

17. The non-transitory computer-readable medium of claim 13, wherein the determining the potential danger associated with the object includes determining that the object is approaching the autonomous vehicle at a speed greater than a pre-determined threshold.

18. The non-transitory computer-readable medium of claim 13, wherein the causing the playback of the second audio includes applying, to the first audio, the sound profile that intensifies the first audio by modifying a rhythm or a melody of the first audio and thereby causing the playback of the second audio.

19. The non-transitory computer-readable medium of claim 13, wherein the system is further configured to performing the steps of:
receiving a third set of data from the vehicle sensor at a third time;
determining, using the third set of data, a presence of plurality of pedestrians in the environment where the autonomous vehicle is being driven; and
causing playback of a third audio that indicates the presence of the plurality of pedestrians.

20. The non-transitory computer-readable medium of claim 17, wherein the determining the increased potential danger of the condition includes determining that a brake of the autonomous vehicle has not been depressed since the first time until the second time.

* * * * *